Aug. 16, 1966    T. L. LANE    3,266,349
LATHE DRIVING AND CENTERING MEANS
Filed Sept. 1, 1964    2 Sheets-Sheet 1
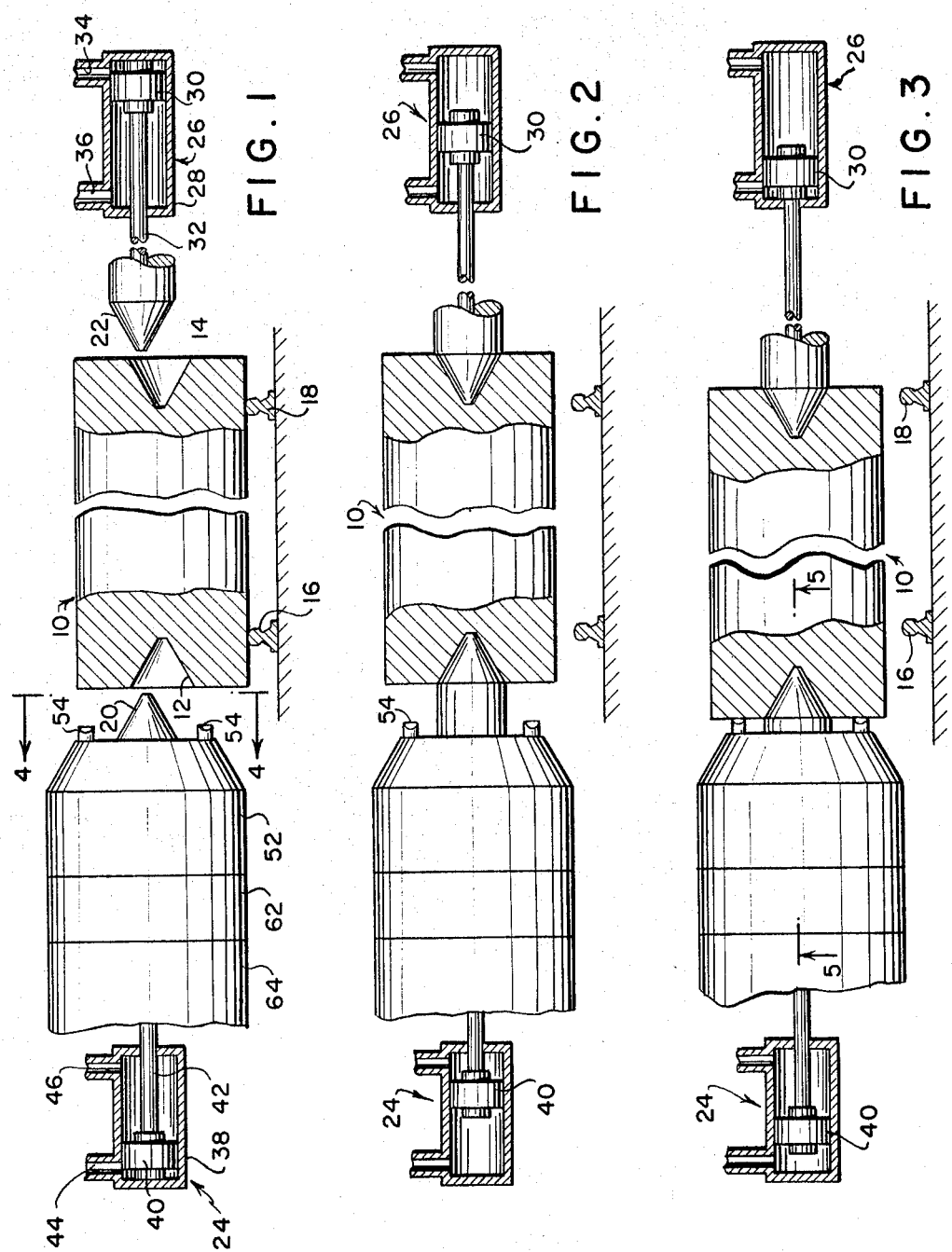
THOMAS L. LANE
INVENTOR.
BY Samuel J Snyder
ATTORNEY Aug. 16, 1966     T. L. LANE     3,266,349

LATHE DRIVING AND CENTERING MEANS

Filed Sept. 1, 1964     2 Sheets-Sheet 2

THOMAS L. LANE
INVENTOR.

BY Samuel J. Snyder

ATTORNEY

United States Patent Office 3,266,349
Patented August 16, 1966

3,266,349
LATHE DRIVING AND CENTERING MEANS
Thomas L. Lane, Brooklyn, N.Y., assignor to ACF Industries, Incorporated, New York, N.Y., a corporation of New Jersey
Filed Sept. 1, 1964, Ser. No. 393,528
8 Claims. (Cl. 82—40)

The invention relates to lathes and similar metal working machines and particularly to headstocks and tailstocks and their associated operating apparatus.

Considerable difficulty is encountered in placing very heavy stock, which cannot be lifted by one or even several men, in a lathe or the like and properly centering and clamping it for driving. The task becomes even more difficult when the driven end of the stock is not truly perpendicular to the axis joining the center bores of the stock or workpiece.

It is an object of this invention to facilitate the mounting of heavy stock in a lathe or the like.

It is another object of the invention to readily center a workpiece in a lathe and equalize the pressure of the drive pins on the workpiece.

It is another object of the invention to provide a headstock of a lathe with positive mechanical means for equalizing the pressure of the workpiece on the driving pins, even when the driven end of the workpiece is not accurately squared off.

Other objects and advantages of the invention will become evident from the following description and the drawing, wherein:

FIGS. 1 to 3 show successive steps in the mounting of a workpiece in a lathe.

Figure 5:
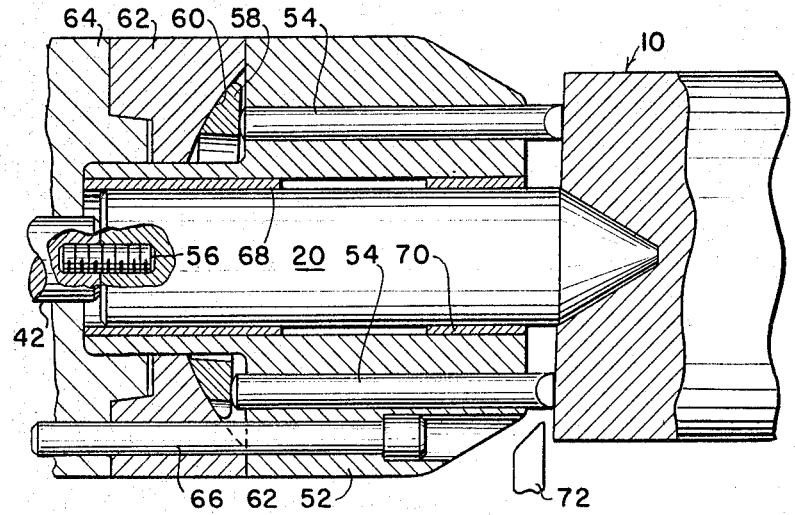
FIG. 5 is a sectional view of a workpiece having a sloping end positioned against the headstock.
Figure 6:
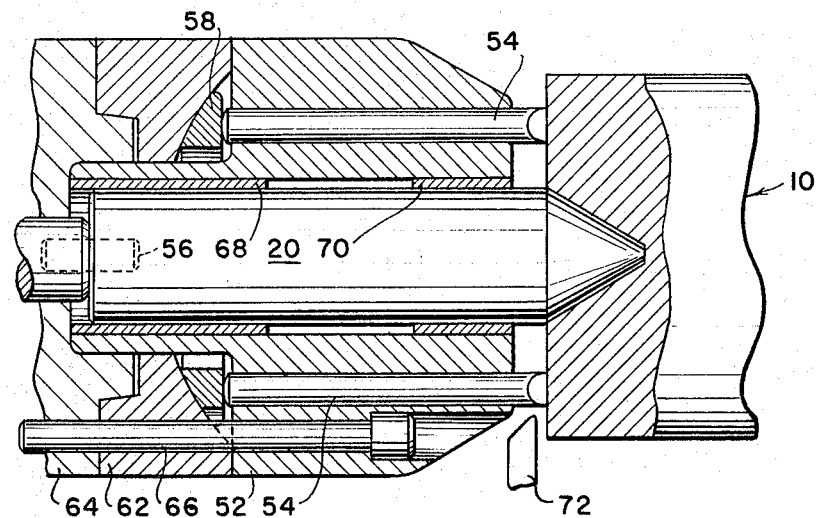
FIG. 6 is a view taken at right angles to that of FIG. 5.
Figure 4:
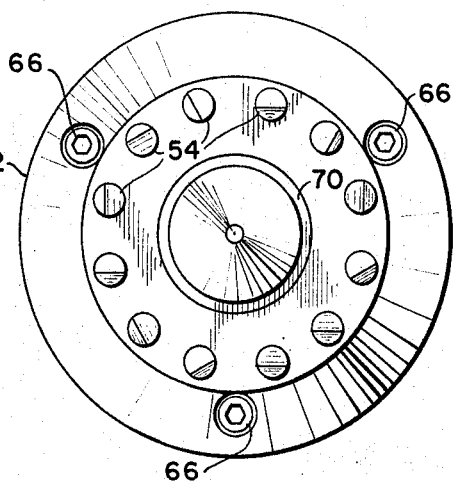
FIG. 4 is an end view of the headstock.

Referring to the drawing, 10 indicates the stock or workpiece, which may be a railroad car axle, provided with center bores 12 and 14. In view of its great weight, the workpiece 10 is placed on rails 16 and 18 and rolled to a position adjacent centers 20 and 22 of a headstock and a tailstock of a lathe. Pressure devices 24 and 26 are adapted to move centers 20 and 22 for engaging workpiece 10. Device 26 comprises a cylinder 28 having a piston 30 fastened to a rod 32 integral with the dead center 22. Cylinder 28 has fluid conduits 34 and 36 connected to suitable sources of air pressure. Live center 20 is connected similarly to pressure device 24, which includes elements 38–46. When sufficient pressure is applied through conduits 24 and 44, with workpiece 10 in proper position as shown in FIG. 1, pistons 30 and 40 are moved inwardly and centers 20 and 22 enter bores 12 and 14, thereby raising and centering workpiece 10 as shown in FIG. 2.

Figure 7:
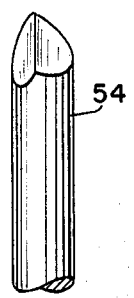
FIG. 7 is a view of one of the drive pins.

Live center 50 comprises a driver body 52 and a plurality of driving pins 54 surrounding center 20. The driving pins may be of the form shown in FIG. 7, or any other suitable form. Center 20 is connected to piston rod 42 by stud bolt 56. Driving pins 54 extend through body 52 into abutment with a cam 58 having a spherical surface 60. Adapter 62 for the cam has a similar spherical bearing surface. Adapter 62 and driver body 52 are fastened to the spindle 64 of the lathe by socket screws 66. Within body 52 bushes 68 and 70 provide bearings for center 20 to permit rotation of body 52 about center 20, and axial movement of center 20. A lathe tool is indicated at 72.

In operation, the heavy workpiece may be rolled along rails 16 and 18 into position adjacent centers 20, 22. Pressure is then applied through conduits 34, 44 to move centers 20 and 22 into bores 12 and 14, to raise the workpiece and center it, as indicated in FIG. 2. Then, some pressure is bled off through conduit 44, or additional counterbalancing pressure may be applied through conduit 34 or 46, to shift the workpiece 10 against driving pins 54, as shown in FIG. 3, with sufficient force to enable pins 54 to drive the workpiece. Where, for example, workpiece 10 is a steel axle about 10 feet long and 5½ inches in diameter, pressure is applied to device 26 to push workpiece 10 onto live center 20 with a force of 6000 pounds and a like force is applied by unit 24. Pressure is then bled off cylinder 38 to bring the workpiece against driving pins 54 with a force of about 5000 pounds and against center 20 with a force of about 1000 pounds. If the end of the workpiece is not square, as for example in FIG. 5, where the end is shown sloping downwardly to the left, one or more driving pins 54 will be engaged before the others by the workpiece. If the lower driving pin 54 in FIG. 5 is engaged first, it will push the lower side of cam 58 to the left and cause it to slide upwardly on the spherical surface of adapter 62. The upper portion of cam 58 will, therefore, force upper driving pin 54 to the right. This action will tend to continue until all driving pins engage the end of the workpiece and the forces of the driving pins against the workpiece are approximately equalized. The workpiece is removed by increasing the pressure applied through conduits 36 or 46, or leaking off the pressure through conduit 34. The air pressure source and valves connected to cylinders 24 and 26 are not shown since such elements are obvious and well known.

A single embodiment of the invention has been disclosed to illustrate the principles thereof. It will be evident that the invention advantageously requires very few moving or adjustable elements to center the workpiece and equalize the grips of the driving pins on the workpiece. Since, variations and modifications of the illustrated embodiment will be evident to those skilled in the art, the invention is not to be construed as limited except as defined in the following claims.

What is claimed is:

1. In a lathe, a headstock and a tailstock each having a center for entering a bore of a workpiece, said headstock having a plurality of driving pins protruding from the headstock and extending parallel to its axis and circularly arranged around the center of the headstock, said headstock having a cam behind said driving pins, said cam having a first surface engaged by said driving pins and an opposite curved surface, said headstock having a similarly curved surface bearing against the curved surface of the cam, means for moving the centers into the bores of the workpiece and moving the centered workpiece against the protruding ends of the driving pins, whereby a greater force on one of the driving pins than on an opposite driving pin moves the cam so as to move said opposite driving pin toward the workpiece.

2. The apparatus defined in claim 1, wherein said cam is a ring-shaped member, said first surface of the cam being flat and said second surface being spherical.

3. The apparatus defined in claim 1, wherein said means for moving each of said centers includes a cylinder, a piston in said cylinder, a rod connecting the piston to the respective center, and means for supplying fluid under pressure to said cylinder.

4. In a lathe, a headstock and a tailstock each having a center for entering a bore of a workpiece, said headstock having a plurality of driving pins protruding from the headstock and extending parallel to its axis and symmetrically arranged around the axis of the headstock, said headstock having a cam behind said driving pins, said cam having one surface engaged by the inner ends of said driving pins and an opposite spherical surface, said headstock having a spherical bearing surface in contact with the spherical surface of the cam, means for moving the centers into the bores of the workpiece and moving the workpiece against the protruding ends of the driving pins, whereby a greater force on one of the driving pins than on an opposite driving pin moves the cam so as to move said opposite driving pin toward the workpiece.

5. In a lathe, a driven headstock and a tailstock each having a center for entering a bore of a workiece, said headstock having a plurality of driving pins protruding from the headstock and extending axially and circularly arranged around the center of the headstock, said headstock having a ring-shaped cam surrounding its center, said cam having a plane surface engaged by said driving pins and an opposite curved surface, said headstock having a curved surface bearing against the curved surface of the cam, means for moving the centers into the bores of the workpiece and then moving the workpiece against the protruding ends of the driving pins, whereby a greater force on one of the driving pins than on an opposite driving pin moves the cam so as to move said opposite driving pin toward the workpiece.

6. In a lathe, a headstock and a tailstock each having a center for entering a bore of a workpiece, said headstock having a plurality of driving pins protruding from the headstock and extending parallel to its axis and circularly arranged around the center of the headstock, said headstock having a cam behind said driving pins, said cam having one surface in abutment with said driving pins and an opposite spherical surface, said headstock having a surface bearing against the spherical surface of the cam, a bearing in said headstock surrounding the center thereof for enabling the headstock to rotate with respect to its center, means for moving the centers into the bores of the workpiece and moving the workpiece against the protruding ends of the driving pins, whereby a greater force on one of the driving pins than on an opposite driving pin moves the cam so as to move said opposite driving pin toward the workpiece.

7. A headstock for a lathe having a center for entering a bore of a workpiece, said headstock having a plurality of driving pins protruding from the headstock and around the center of the headstock, said headstock having a cam behind said driving pins, said cam having one surface engaged by said driving pins and an opposite curved surface, said headstock having a similarly curved surface bearing against the curved surface of the cam, and means for moving the center, whereby a greater force exerted by the workpiece on one of the driving pins than on a diametrically opposite driving pin moves the cam so as to move said opposite driving pin toward the workpiece.

8. A headstock according to claim 7, wherein said cam is in the form of a ring and said curved surfaces are spherical.

No references cited.

WILLIAM W. DYER, JR., *Primary Examiner.*